United States Patent [19]

Hierath et al.

[11] 4,007,855

[45] Feb. 15, 1977

[54] LIQUID DISPENSER OF THE METERING TYPE

[75] Inventors: Leonard L. Hierath, Denver; W. Kendall Holmes, Aurora, both of Colo.

[73] Assignee: Joseph M. Magrath, McCook, Nebr.

[22] Filed: Mar. 24, 1975

[21] Appl. No.: 561,535

[52] U.S. Cl. .................. 222/26; 222/43; 222/44; 222/49; 222/309; 222/340; 251/114; 141/27

[51] Int. Cl.² ........................ G01F 11/06

[58] Field of Search .......... 222/309, 340, 335, 43, 222/44, 49–50, 518, 509, 387, 402.16, 26, 472–473; 141/2, 18, 27; 251/114, 116, 74, 109

[56] References Cited

UNITED STATES PATENTS

| 1,318,120 | 10/1919 | Wheaton | 251/109 |
|---|---|---|---|
| 1,660,581 | 2/1928 | Schmidt | 251/74 X |
| 2,568,308 | 9/1951 | Wells | 251/74 X |
| 2,617,560 | 11/1952 | Pietrzak | 222/340 |
| 2,960,038 | 11/1960 | Lupfer et al. | 222/309 X |
| 3,162,336 | 12/1964 | Erickson | 222/309 |
| 3,294,290 | 12/1966 | Erickson et al. | 222/335 |
| 3,327,900 | 6/1967 | Goda | 222/49 X |
| 3,537,620 | 11/1970 | Artmann | 222/340 X |
| 3,782,598 | 1/1974 | Basa | 222/340 X |
| 3,830,410 | 8/1974 | Magrath et al. | 222/309 |

*Primary Examiner*—Robert B. Reeves
*Assistant Examiner*—Charles A. Marmor
*Attorney, Agent, or Firm*—Wm. Griffith Edwards

[57] ABSTRACT

A liquid metering dispenser is actuated by a trigger. The trigger releases a valve rod which is spring actuated to close a fluid pressure inlet, opening the discharge outlet of the dispenser to release a stored measured charge of liquid by operation of a spring actuated piston. The trigger is cocked by drawing the valve rod to close the discharge valve and open the liquid pressure inlet; the liquid under pressure enters the storage chamber, compressing the piston spring until it strikes an adjustable stop. The piston and spring assembly is readily removable for cleaning and servicing.

6 Claims, 8 Drawing Figures

U.S. Patent  Feb. 15, 1977  Sheet 1 of 2  4,007,855
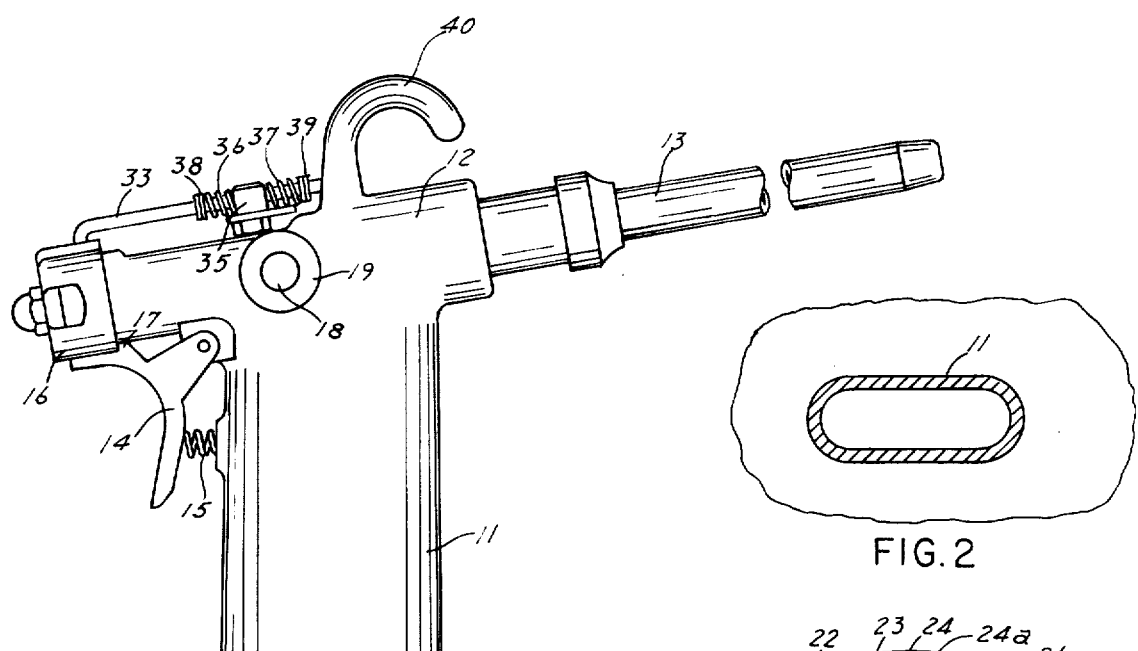
FIG. 2
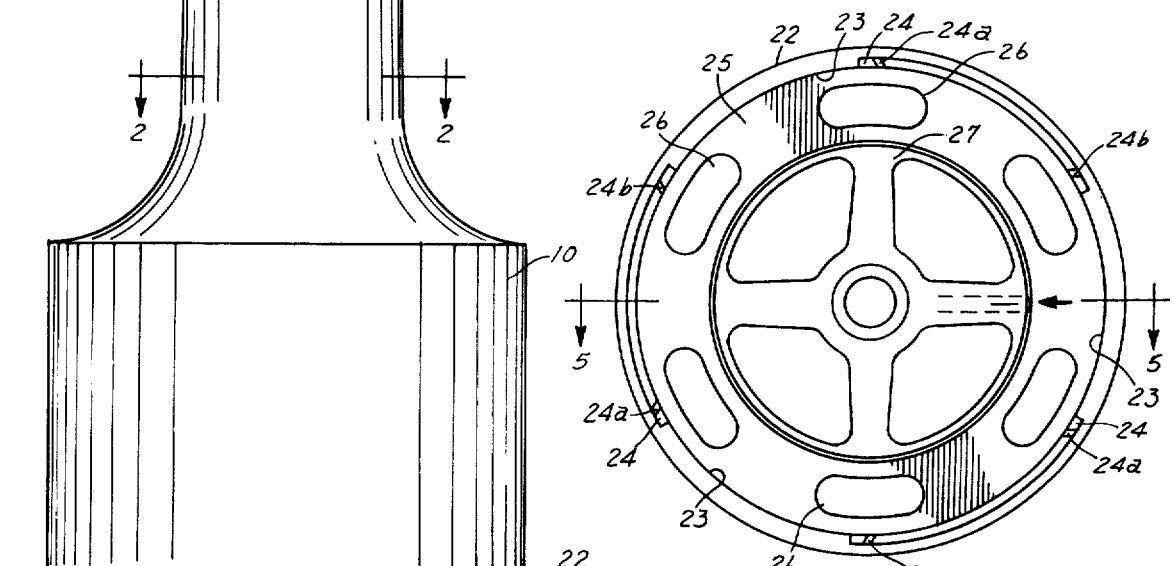
FIG. 3
FIG. 1
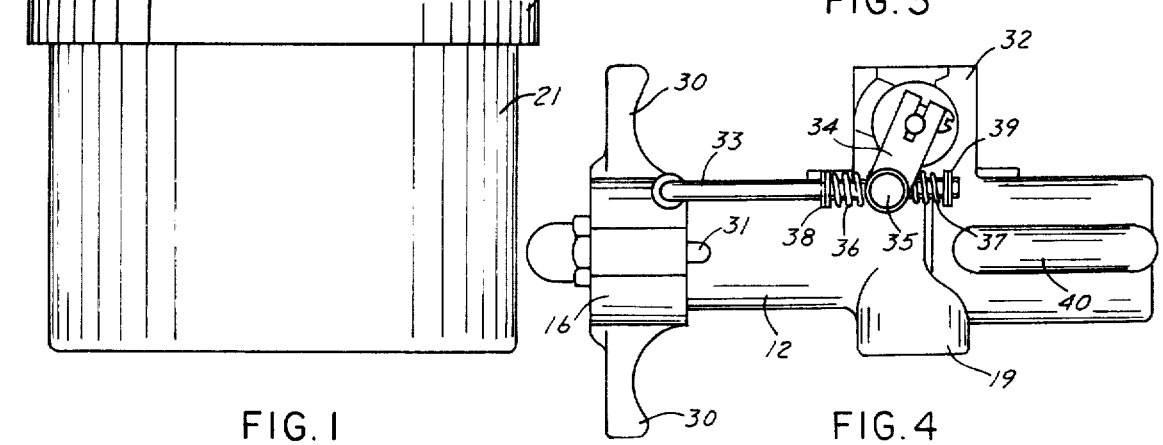
FIG. 4

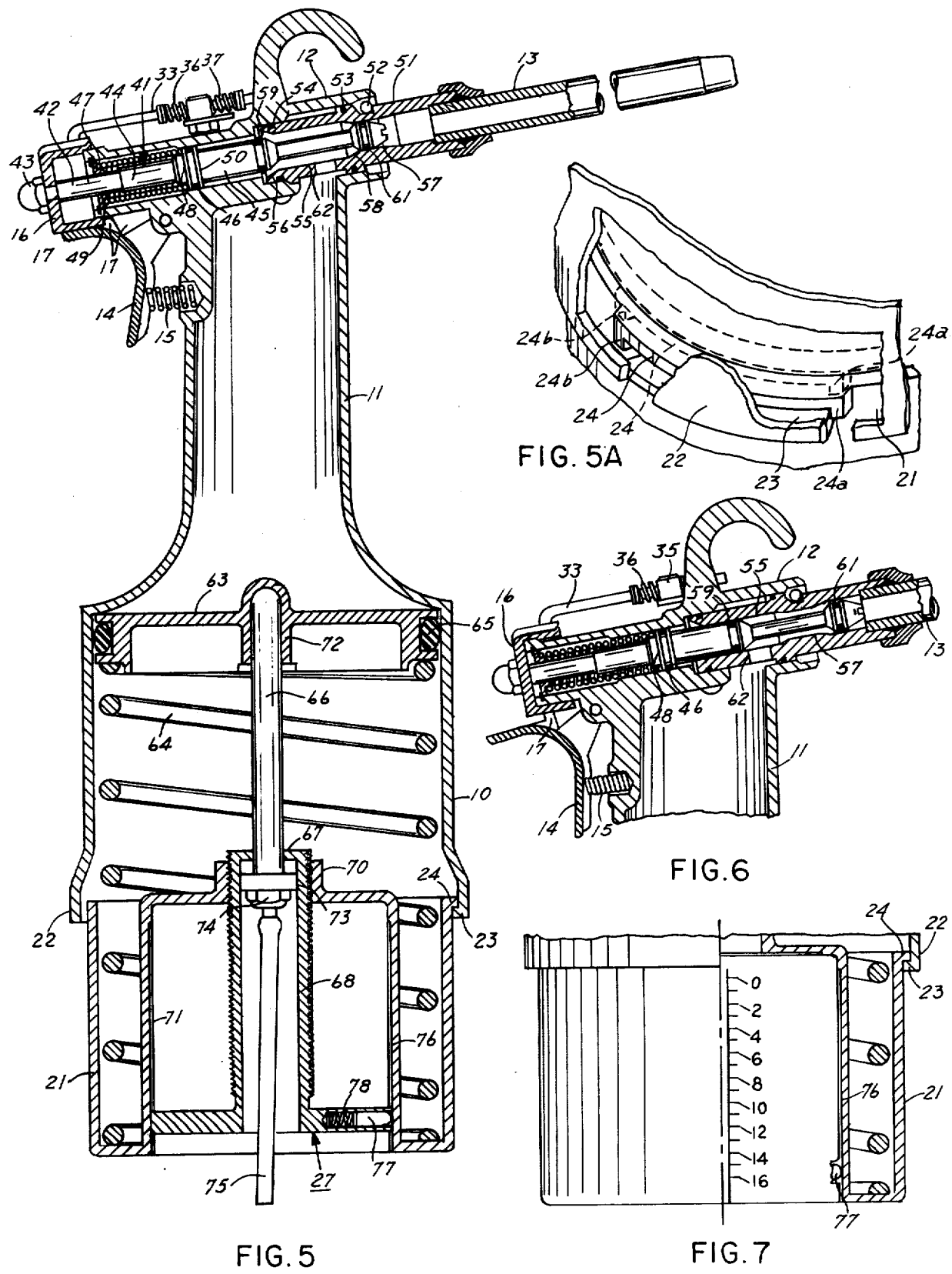

LIQUID DISPENSER OF THE METERING TYPE

This invention relates to devices for dispensing measured quantities of liquid and particularly to such dispensing device having an improved construction and actuating mechanism.

Liquid dispensing devices of the metering type have been provided heretofore for various different purposes. Some such devices have been built into liquid dispensing systems such as coin-operated soft drink dispensers; others have been hand-held devices for administering medicines to animals. One such device was developed and used for dispensing drinking water to astronauts in space. The food preparing industry is another field in which measured amounts of liquid are required to be supplied during various stages of a process. It is desirable that a liquid dispenser for this purpose be easy to handle and to adjust to different amounts of liquid to be discharged. Accordingly, it is an object of this invention to provide an improved hand manipulated liquid dispenser of the metering type.

It is another object of this invention to provide a liquid dispenser of the metering type including an improved arrangement for effecting the discharge of a precise selected quantity of liquid upon each operation of the dispenser.

It is a further object of this invention to provide a liquid dispenser of the metering type including an improved structural arrangement for facilitating the disassembly and servicing of the dispenser.

Briefly, in carrying out the objects of this invention in one embodiment thereof, a hand held liquid dispenser is constructed to provide a liquid reservoir including a cylinder with which a spring pressed piston is arranged to be compressed to a selected position by pressure from a liquid supply. A sliding valve rod carries a fluid pressure inlet valve and a discharge valve, each being opened when the other is closed. The valve rod is biased toward its discharge position by a spring which is compressed by drawing it back until it is latched by a trigger. In this position the metering chamber is charged with liquid. When the trigger is released the valve slides forward, cutting off the pressure supply and opening the discharge port, thus dispensing the preselected charge. The entire piston assembly is readily removable without tools. The piston assembly includes visible indicia for indicating the set amount of liquid to be discharged.

The features of novelty which characterize this invention are pointed out with particularity in the claims appended to and forming a part of this specification. The invention itself, however, together with further objects and advantages thereof will best be understood with reference to the following description taken in connecton with the accompanying drawings in which:

FIG. 1 is a side elevation view showing a dispenser embodying the invention;

FIG. 2 is a sectional plane view along the line 2—2 of FIG. 1;

FIG. 3 is a bottom plan view of the dispenser of FIG. 1;

FIG. 4 is a somewhat enlarged top plan view of a portion of the dispenser of FIG. 1;

FIG. 5 is a sectional elevational view of the dispenser of FIG. 1;

FIG. 5a is a enlarged perspective, partly broken away, of a portion of the dispenser of FIG. 5;

FIG. 6 is an artial sectional view showing the valve in its discharge position;

FIG. 7 is a side elevation view of the lower portion of the dispenser of FIG. 1 partly in section and partly broken away to show the capacity indicia of the device.

Referring now to the drawings, the dispenser illustrated in FIG. 1 comprises a cylindrical main body portion 10 having necked down handle portion 11 on which is mounted a T-shaped portion 12 having a nozzle or discharge tube 13 extending therefrom. The handle portion 11 is necked down abruptly from the main body 10 to a typical oblong section as illustrated in FIG. 2. The device is provided with a spring pressed trigger 14 biased away from the portion 11 by a spring 15 and shown in its cocked position wherein a head member 16 is latched against a sear or lug of the trigger indicated at 17. Liquid under pressure may be admitted to the interior of the device through an inlet opening 18 formed in a boss 19 to which a pressure supply hose or conduit may be connected. A cup-like closure member 21 is removably attached to the lower portion of the cylindrical body 10 which has an enlarged portion 22 for accommodating the upper end of the cup 21. As shown in FIG. 3, the portion 22 is provided with three inwardly projecting arcuate flanges 23 equally spaced in positions of 120° from one another. The arcuate openings between the flanges 23 are arranged to receive outwardly extending flanges 24 spaced 120° from each other on the cup so that the cup may be moved into position at the flanges 24 passing through the spaces between the flanges 23 and then turned in the manner of a bayonet joint to secure the cup in position on the body 10.

The cup is a double-walled cylindrical structure having its bottom wall 25 lying in a plane at right angles to the axis of the cylinder and provided with a plurality of openings 26. A spider or adjusting wheel 27 is mounted within the cup 21 and is threadedly mounted in the cup in a manner to be described below, so that its position in the cup may be adjusted. This adjustment changes the capacity of the cylinder 10 to select the desired amount of liquid to be discharged.

As shown in FIG. 4, the head member 16 is provided with wings 30 which may easily be gripped by two fingers when pulling the head back to cock the mechanism. The head member 16 is retained against rotation by a projection 31 on the top of the T-member 12 which fits within a groove formed in the head 16. Each time the dispenser is cocked and the trigger moved into the position shown in FIG. 1, a counter 32 is prepared for counting by a rod 33 pivoted on the head 16 and which engages a radial arm 34 of the counter. The arm 34 is pivoted to a slide block 35 which is freely slidable on the rod 33 within limits determined by springs 36 and 37 positioned about the rod and extending between the block 35 and detachable stops 38 and 39 which are C-washers snapped into position in slots in the rod 33. The lateral swinging of the rod 33 further affords easy movement of the arm 34. The springs 36 and 37 allow the arm 34 to move slightly against the springs so that the counter 32 may be operated without shock or damage due to overtravel. The dispenser may be suspended near its point of use by suitable cable or other element attached to a hook 40 at the top of the T-member 12.

The internal structural features of the dispensing device are illustrated in FIGS. 5 and 6. The head member 16 as shown in these figures is attached to the outer end of a valve rod 41 by a nut 43 which securely fastens the head to an outer end portion 42 of the rod. The rod is slidably mounted in an axial bore in the T-portion 12 and has mounted at spaced positions O-rings which engage the internal wall of the bore and alternatively close the discharge outlet to the nozzle 13 and the pressure fluid inlet to the reservoir formed in the main body 10 and the neck portion 11. In FIG. 5 rod 41 is shown as comprising the portion 42 to which the head 16 is attached and a portion 44 of greater diameter followed by a portion 45 of still greater diameter. An O-ring 46 is mounted between the portions 44 and 45 and seals the interior of the passage against leakage toward the head member 16. a spring 47 is mounted about the section 44 of the valve rod 41 between an annular shoulder 48 formed on the valve rod 41 and to a collar 49 retained against a retaining ring seated in a groove in the internal wall of the T-member 12. This spring is compressed between the shoulder 48 and the collar 49 when the member 16 is drawn outwardly to cock the valve mechanism and is released when the sear 17 is moved out of engagement with the member 16 on pressing the trigger 14. The O-ring 46 is mounted between the shoulder 48 and a second annular shoulder 50 spaced therefrom which provides a retaining groove for the O-ring. The nozzle 13 is mounted in a valve sleeve 51 which is slidable in the member 12 and is locked in position by a removable pin 52 and is sealed in the T-member 12 by O-rings 53 and 54. The sleeve 51 is provided with a cylindrical passage 55 having a tapered entrance 56 and a smaller diameter passage 57 having a tapered portion 58 for connecting the passages 55 and 57. The valve member 41 is provided with an O-ring 59 of a diameter for sealing the passage 55 and an O-ring 61 of a diameter for sealing the passage 57 in the position of the valve stem 41 as illustrated in FIG. 5.

The valve rod 41 and trigger mechanism 14 as illustrated in FIG. 5 are shown in position for charging so that when the pressure liquid is admitted through the inlet 18 shown in FIG. 1 the liquid will flow around the portion 45 of the valve rod and thence out to the passage 55 around the O-ring 59 and thence into the reservoir through a port 62 in the sleeve 51. The liquid under pressure forces a piston 63 downwardly against the pressure of a helical spring 64. The piston 63 is sealed in the cylindrical chamber of the body 10 by an O-ring 65 and is securely mounted on a guide rod 66 passing through the upper end 67 of an adjustable cylinder 68. Cylinder 68 is the hub portion of the adjusting wheel 27 and is threaded in a boss 70 formed in the end wall of an inner cylindrical cup 71 of the closure member 21. The piston is moved downwardly until a hub or boss 72 at the center thereof strikes the stop member 67. The spring is mounted with its lower portion lying about the cup portion 71 within the double-walled portion of the closure 21. A guide disc 73 is secured to the lower end of the guide rod 66 by a nut 74 and is slidable within the cylindrical tube 68 so that it acts as a guide for the piston and prevents jamming which might occur in the event of an out of line position of the rod 66. An indicator member 75 which may be a plastic rod or tube is attached to the lowermost end of the guide rod 66, and, as the piston moves down, the member 75 extends outside the lower end of the closure member by a distance depending upon the setting of the position of the cylinder 66 in the threaded boss 70. Since the piston moves downwardly under the pressure of the liquid until it strike the stop 67, the distance to which the indicator 75 extends beyond the bottom of the closure member is an indication that the piston has been actuated and has reached its stop position.

When the liquid charge is to be discharged through the nozzle 13 the trigger 14 is pressed releasing the head 16 so that the spring 47 drives the rod 41 forward until the O-ring 59 seals against the passage 55 and then moves somewhat further until the O-ring 61 moves out of engagement with the passage 57 to open the passage from the reservoir to the nozzle 13. Upon the release of pressure thus effected, the piston rises, forcing the measured charge out through the nozzle 13. The rod 41 is now in the position illustrated in FIG. 6 wherein the sear 17 bears on the outside diameter of the head member 16 and the dispenser is ready to be reset by drawing the member 16 back to the left as viewed in FIGS. 5 and 6. The sear 17 bears on the outside diameter of the member 16 as the member is moved away from its position in FIG. 6. When the member is moved far enough for the sear to return to its position in FIG. 5, the member 16 is released and is held in the cocked position by the sear 17 and is ready for the next discharge operation. When the trigger is pressed and the piston 63 forces liquid out of the dispenser, the piston returns to its position shown in FIG. 5 in which the indicator member 75 is in its least extended position indicating that the device has been discharged.

As illustrated in FIGS. 5 and 7, the inner wall of the cup 71 is provided with an axial groove 76; this groove provides a stop position for the adjusting member 27 which is provided with a detent illustrated as a plunger 77 urged outwardly by spring 78 so that upon each revolution of the member 27 the plunger will enter the groove 76. The pitch of the threads may be calibrated so that the detend or plunger 77 which will enter the groove 76 once during each revolution will enter the groove upon each one-half fluid ounce change in a capacity of the chamber within the cylinder 10. In order that the operator may know the set capacity of the dispenser, the capacities are indicated by indicia on the inner wall of the cup 71 as shown in FIG. 7, it being understood that the plunger will enter the groove on each revolution of the adjusting member 27 so that intermediate positions may also be selected if desired. At the successive one-half fluid ounce positions the corresponding indicia will be in alignment with the bottom outside wall of the adjustor 27.

As described above, the cup member 21 is secured on the lower end of the cylinder 10 by three flanges 24 which engage flanges 23 on the cylinder 10. As shown in FIGS. 5 and 5a, the flanges are held tightly together in locked engagement by the pressure of the spring 64, and flange locks 24a and 24b which are short projections or lugs at the ends of flanges 24. These locking lugs have been illustrated as three sets or pairs, one pair on each flange 24. In FIG. 5a the dotted lines indicate the position of the top of the cup 21 just before it is moved into locking position. One lug of a pair prevents relative rotation in one direction and the other in the other direction. A single pair of locking lugs may be sufficient, and obviously the lugs may be on either the flange 23 or the flange 24 provided they perform their required function of preventing rotation of the cup 21 in either direction. When it is desired to remove the piston assembly, the stop 67 is moved to its lowermost position to compress the spring 64 and pull the piston 63 away from the end of the cylinder bore. The entire cup assembly is then forced into the bore to clear flange locks 24a and 24b. The member 21 is then turned in either direction until the flanges 24 can pass through the arcuate spaces between the flanges 23 and allow the assembly to be removed. It will be observed that when the piston is under fluid pressure, the cup 21 is even more securely locked in position.

During operation of the dispenser both on charging and discharging, the openings 26 in the bottom of the cup member 21 provide ready passage for air so that the effect of air compression or expansion when the piston moves will be negligible.

Although this invention has been illustrated and described as employed in a single embodiment, various modifications and applications will occur to those skilled in the art. Therefore, it is not desired that the invention be limited to the structure illustrated and it is intended, by the appended claims, to cover all modifications which fall within the spirit and scope of the invention:

We claim:

1. In a liquid dispensing device of the type comprising a cylinder and a piston therein and means for biasing the piston toward its minimum volume position in the cylinder at one end thereof, said device having a liquid pressure inlet and a tubular discharge outlet arranged in communication with said cylinder and including a single valve means for alternatively admitting liquid to the cylinder from the inlet for overcoming said biasing means and charging the cylinder and utilizing the biasing means for discharging the liquid from the cylinder through the outlet, the improvement which comprises means for biasing the valve means toward its liquid discharge position, means for manually moving said valve means to its liquid inlet position against the force of said valve biasing means for charging said cylinder with liquid, and a spring pressed trigger mounted on said device and positioned for engaging and latching said valve means in its liquid inlet position whereby upon movement of said trigger against the pressure of said spring said valve means is released and said liquid inlet is closed and said valve means is moved to its liquid discharge position and the liquid charge in said cylinder is discharged by operation of said piston biasing means, said improvement including an adjustable stop means mounted on the other end of said cylinder in the path of said piston for engaging said piston and limiting the movement of said piston against said piston biasing means and for selecting the amount of liquid to be stored in and discharged from said cylinder, said piston having a central guide shaft rigidly attached thereto and slidably mounted in said stop means for guiding the axial movement of said piston in said cylinder, and said improvement further including an end closure detachably secured to said other end of said cylinder and comprising a double walled cup opening outwardly, and having spaced inner and outer walls opening inwardly, said biasing means comprising a spring and said cup providing a seat for said spring, said spring having a portion within said walls about said inner wall, said cup having a threaded opening in its inner end and said stop means being threaded therein and comprising a tube having one end opening outwardly and the other end closed and having an opening for slidably receiving said guide shaft.

2. A liquid dispensing device as set forth in claim 1 including an indicator element and means for attaching it to the lowermost end of said guide shaft externally of said cylinder and remote from said piston and protruding from the dispenser and, said indicator being movable with said guide shaft for indicating the state of charge of said dispenser.

3. A liquid dispensing device as set forth in claim 1 including a flange about the outer end of said tube and movable axially within said cup on adjustment of said tube for facilitating the turning of said tube with repect to said cup, said inner wall of said cup having an axial groove therein, and an outwardly biased detent on said flange for engaging said groove once during each complete revolution of said tube whereby the movement of said stop may be determined by counting the number of engagements of said detent in said groove, and whereby said detent retains said stop in its adjusted position.

4. A liquid dispensing device as set forth in claim 1 including an indicating scale on the inner wall of said cup for indicating the adjusted capacity of said cylinder, said stop means having a portion adjacent said scale positioned to move along the scale upon adjustment of said stop means, said scale being visible at the outer edge of said portion through the open end of said cup.

5. A liquid dispensing device as set forth in claim 1 wherein said cup and said main body have respective pluralities of outwardly and inwardly extending arcuate flanges, said flanges being equally spaced circumferentially and the spaces of each plurality of flanges affording passage of the flanges of the other plurality of flanges upon axial movement of said cup and said body with respect to one another, said inwardly and outwardly extending flanges being held in frictional engagement by said piston spring when said flanges overlap and said cup being removable upon rotation to place said outwardly extending flanges in register with the spaces between the inwardly extending arcuate flanges in said main body to afford removal of said cup and said piston from said main body.

6. A liquid dispensing device as set forth in claim 5 including at least one pair of locking elements on said arcuate flanges extending into the path of rotation of the arcuate flanges for engagement therewith for locking said cup and body against accidental disengagement with one another.

* * * * *